United States Patent
Schneider

[19]

[11] Patent Number: 6,153,851
[45] Date of Patent: Nov. 28, 2000

[54] POWER SUPPLY WITH THERMISTOR PRECHARGE AND PROTECTION CIRCUIT

[75] Inventor: Joe Schneider, Menasha, Wis.

[73] Assignee: Illinois Tool Works Inc., Glenview, Ill.

[21] Appl. No.: 08/886,801

[22] Filed: Jul. 2, 1997

Related U.S. Application Data

[63] Continuation-in-part of application No. 08/587,901, Jan. 16, 1996.

[51] Int. Cl.[7] .................................................... B23K 10/00
[52] U.S. Cl. .............................. 219/121.54; 219/121.57; 219/121.39; 219/121.45; 361/106
[58] Field of Search ....................... 219/121.54, 121.53, 219/121.57, 121.39, 121.45; 361/102–109, 6–12

[56] References Cited

U.S. PATENT DOCUMENTS

| | | | |
|---|---|---|---|
| 3,916,264 | 10/1975 | Berg | 317/41 |
| 3,935,511 | 1/1976 | Boulanger et al. | 317/50 |
| 5,031,066 | 7/1991 | Wagner et al. | 361/90 |
| 5,319,533 | 6/1994 | Reynolds . | |
| 5,379,176 | 1/1995 | Bacon et al. | 361/106 |
| 5,393,954 | 2/1995 | Pasquini et al. | 219/121.54 |
| 5,543,705 | 8/1996 | Uezono et al. | 323/369 |
| 5,627,738 | 5/1997 | Lubomirski . | |
| 5,703,746 | 12/1997 | Onizuka et al. | 361/106 |

FOREIGN PATENT DOCUMENTS

| | | |
|---|---|---|
| 0 098647 A1 | 1/1984 | European Pat. Off. . |
| 0508218 | 6/1939 | United Kingdom . |
| 2144386 | 3/1985 | United Kingdom . |
| 2300982 | 11/1996 | United Kingdom . |
| 2320145 | 10/1998 | United Kingdom . |

*Primary Examiner*—Mark Paschall
*Attorney, Agent, or Firm*—George R. Corrigan

[57] ABSTRACT

A power supply with an input protection circuit is disclosed. The protection circuit includes a thermistor that heats up if the power supply is mistakenly connected to an excessive input voltage. When the thermistor gets hot, its resistance increases, and isolates the down stream portion of the power supply from the input voltage. A relay in parallel with the thermistor is closed, thus shorting the thermistor, after a preset time if the input voltage had a proper magnitude.

6 Claims, 3 Drawing Sheets

POWER SUPPLY WITH THERMISTOR PRECHARGE AND PROTECTION CIRCUIT

RELATED APPLICATIONS

This application is a continuation-in-part of U.S. patent application Ser. No. 08/587,901 filed Jul. 16, 1996 entitled Plasma Cutting or Arc Welding Power Supply with Phase Staggered Secondary Switches, Reynolds et al., which is hereby incorporated by reference.

FIELD OF THE INVENTION

This invention relates generally to plasma arc cutting and welding power supplies, and more particularly to a protection circuit for protecting such power supplies from damage in the event that they are connected to the wrong input voltage.

BACKGROUND OF THE INVENTION

Plasma arc cutting and welding are processes in which an electric arc is used to perform work, either cutting or welding, on a work piece. The arc creates a plasma that either cuts or welds the work piece (or filler metal used to weld the work piece).

Power sources typically convert a power input to a necessary or desirable power output tailored for a specific application. In welding applications, power sources typically receive a high voltage alternating current (vac) signal and provide a high current output welding or cutting signal. Often, line power sources (sinusoidal line voltages) are either 115V or 230V (or other voltages where one is double the other). These sources may be either single-phase or three-phase and either 50 or 60 Hz. Welding power sources receive such inputs and produce an approximately 10–40 volt dc or ac high current welding output. Cutting power sources produce an output at approximately 90–125 volts.

Generally, a welding or cutting power source is designed for a specific power input. In other words, the power source cannot provide essentially the same output over the multiple input voltages. Further, components which operate safely at a particular input power level are often damaged when operating at an alternative input power level. Therefore, power sources in the prior art have provided for these various inputs by employing circuits which can be manually adjusted to accommodate a variety of inputs. These circuits generally may be adjusted by changing the transformer turns ratio, arranging primary windings in parallel or series, changing the impedance of particular circuits in the power source or arranging tank circuits to be in series or in parallel. However, an improperly linked power source could result in power source failure.

Some prior art welding sources provided an automatic linkage. For example, the Miller Electric AutoLink™ is one such power source and is described in U.S. Pat. No. 5,319,533 incorporated herein by reference. Such power sources test the input source voltage when they are first connected and automatically set the proper linkage for the input source voltage that it senses. Such welding power sources, if portable, are generally inverter-type power sources. The inverters may be connected in parallel (for 230V) or in series (for 460V). Such arrangements generally allow for two voltage connection possibilities. This design works well, but it may be costly to implement.

Certain types of power sources (such as inverters or those with torroidal transformers) need to have special control during the initial application of input power in order to control the input current for a period of time (typically 1 to 3 seconds) so that adverse effects are not created. Such adverse effects may include circuit breaker tripping or internal component overload. The circuit that controls primary current during the start up of a power source is often called a precharge circuit. Precharge circuits are found in inverter type power sources as well as conventional type power sources (non-inverter). A typical precharge circuit includes a resistor for limiting current.

Plasma cutting arc power supplies are often designed to be relatively easy to switch back and forth between two input voltages (115 and 230 volts ac, e.g.). Unfortunately, users may accidently plug the unit into the higher ac line voltage when the linking is set for the lower voltage. This doubles the input voltages to the power source, and causes excessive inrush current. If the power supply includes a precharge circuit, a resistor (e.g. 10 ohms) will receive excessive inrush current. This inrush current is often so great that it causes the resistor to melt down, thereby electrically opening the resistor as if it were a fuse. This disables the plasma power supply until the resistor is replaced. This often protects circuitry in the power supply, but necessitates the replacement of the precharge resistor which may be inconvenient and/or expensive. Also, if the power supply is erroneously plugged into a line voltage greater than the highest voltage for which the power supply is designed, then the inrush current would be excessive and likely melt the precharge resistor.

Prior art U.S. Pat. No. 5,627,728, issued to Lubomirsky et al. describes a soft start circuit for trickle charging a capacitor bank. The trickle charge is accomplished using a thermistor in parallel with the power switch. Thus, even when the power switch is off the thermistor charges the capacitors. The thermistors do not protect current from flowing to downstream components, rather they allow current to flow to downstream components even when the switch is opened.

Accordingly, a power supply capable of receiving more than one input and having a precharge circuit that protects components, but does not need replacing in the event of incorrect linking or excessive voltage (i.e. a voltage that will damage components) is desirable.

SUMMARY OF THE PRESENT INVENTION

According to one aspect of the invention a power supply receives an input and provides an arc output. The power supply has an input protection circuit that includes a thermistor. If an excess input voltage is applied, by incorrect linking for example, the thermistor gets hot and its resistance increases. Thus, the remainder of the power supply is electrically isolated from the input voltage.

The power supply includes a chopper in one embodiment, and an inverter in another embodiment.

The thermistor is bypassed after a preset time in an alternative embodiment. Thus, the thermistor is removed from the circuit. In one embodiment the thermistor is part of a precharge circuit. The bypass and precharge features may be implemented with a relay.

Other principal features and advantages of the invention will become apparent to those skilled in the art upon review of the following drawings, the detailed description and the appended claims.

Figure 1:
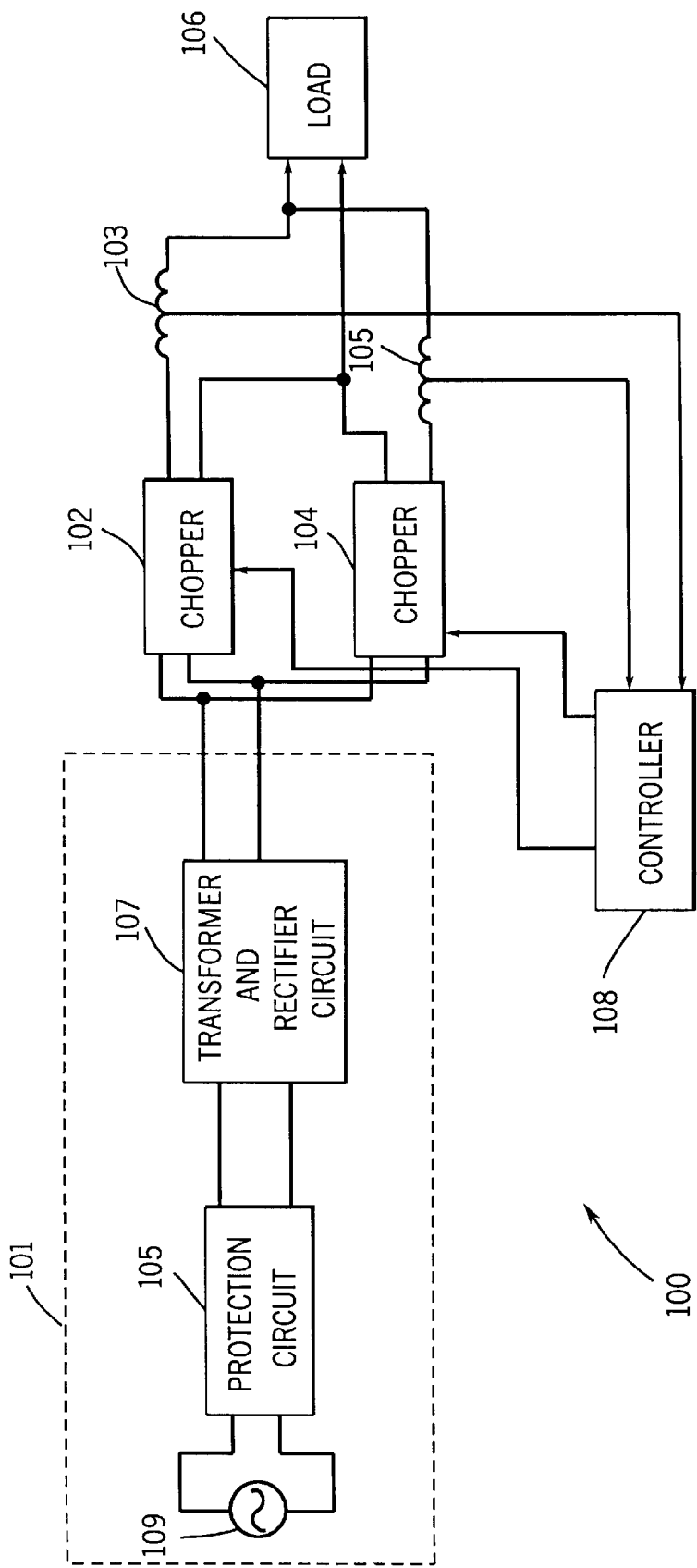
FIG. 1 is block diagram of the embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a chopper-type power supply and a torroidal transformer it should be understood at the outset that the other power supplies can also be protected with this invention. Also, the thermistor may be placed in a different location, and protect other components.

Generally, the preferred embodiment of the present invention uses a thermistor to protect a power supply from misapplication of power. It is not unusual for users of plasma arc cutting power supplies, or welding power supplies, to connect the power supply to a 230 volt ac line power source, but leave the internal switches and or connections set to a 115 volt line setting. Thus, the input circuitry of the power supply will see a voltage twice that for which the components are designed.

A resistor in a conventional precharge circuit is replaced by a thermistor having a positive temperature coefficient (PTC), in accordance with the preferred embodiment. The PTC thermistor in the preferred embodiment is approximately 10 ohms at normal operating temperatures of the power source. However, when over voltage conditions occur, such as that caused by misapplication of input power, the inrush current becomes very high relative to the inrush current when the voltage is appropriate. Then the PTC thermistor gets hot and becomes a very high resistance (until it cools down). This resistance stops the inrush of current from overloading the thermistor and the rest of the power source, thus protecting the power source. The heat-caused high resistance of the thermistor disconnects or electrically isolates the power supply from the line voltage (as used herein electrically isolating the input voltage from the power supply means that a large impedance blocks the input voltage from being applied to the portion of the power supply following the protection circuit, i.e. the downstream portion of the power supply). Thus, the power supply does not work. The user will likely refer to an owner's manual, which states one possible cause of this sort of problem is incorrect linking. Also, after the PTC thermistor cools down, the power source may be used in a normal fashion, (with proper linking) without need to replace components. Thus, the owners manual can include instructions to relink, wait, and try again.

Generally, a plasma arc cutting power supply made in accordance with the preferred embodiment is shown in FIG. 1. Plasma arc cutting power supply 100 includes a chopper 102 and a chopper 104, connected in parallel. Both choppers 102 and 104 receive an input voltage from a voltage source 101. Chopper 102 includes an output current sensing LEM 103 and chopper 104 includes an output current sensing LEM 105. The choppers outputs are provided to a load 106 (i.e. the torch and the work piece). A controller 108 receives a current feedback signal from LEMs 103 and 105, as well as a current reference signal. The current reference signal is a user selected current cutting magnitude and is typically provided by a potentiometer on the front panel of the plasma arc cutting power supply. Controller 108 provides a first switching signal to chopper 104 and a second switching signal to chopper 102. The switching signal determines when the switches in choppers 102 and 104 turn on.

Choppers 102 and 104 are preferably operated out-of-phase with respect to one another. Specifically, chopper 104 is operated 180° out-of-phase with respect to chopper 102, to reduce the ripple output of power supply 100.

A plasma arc cutting supply is described in more detail in U.S. patent application Ser. No. 08/587,901, which is hereby incorporated by reference.

Voltage source 101 is comprised of a line voltage 109, which may be 115 or 230 volts in the preferred embodiment. The line voltage is provided to a protection circuit 105 (described in detail below) and a transformer and rectifier circuit 107. Transformer and rectifier circuit 107 preferably includes a torroidal transformer having a secondary connected to a full bridge rectifier, and may be followed by a capacitor or a capacitor bank to provide relatively smooth and flat voltage source.

The torroidal transformer of transformer and rectifier circuit 107 preferably includes two primary windings, as is typical in the art. When linked for a 230 volt input, the windings are connected in series. When linked for 115 volts, the windings are connected in parallel. The switch to select between configurations is often located on the front panel or within the power supply.

Torroidal transformers typically require a precharge circuit. Thus, the present invention will be useful for torroidal transformer power supplies that have applications beyond welding and plasma cutting.

Figure 2:
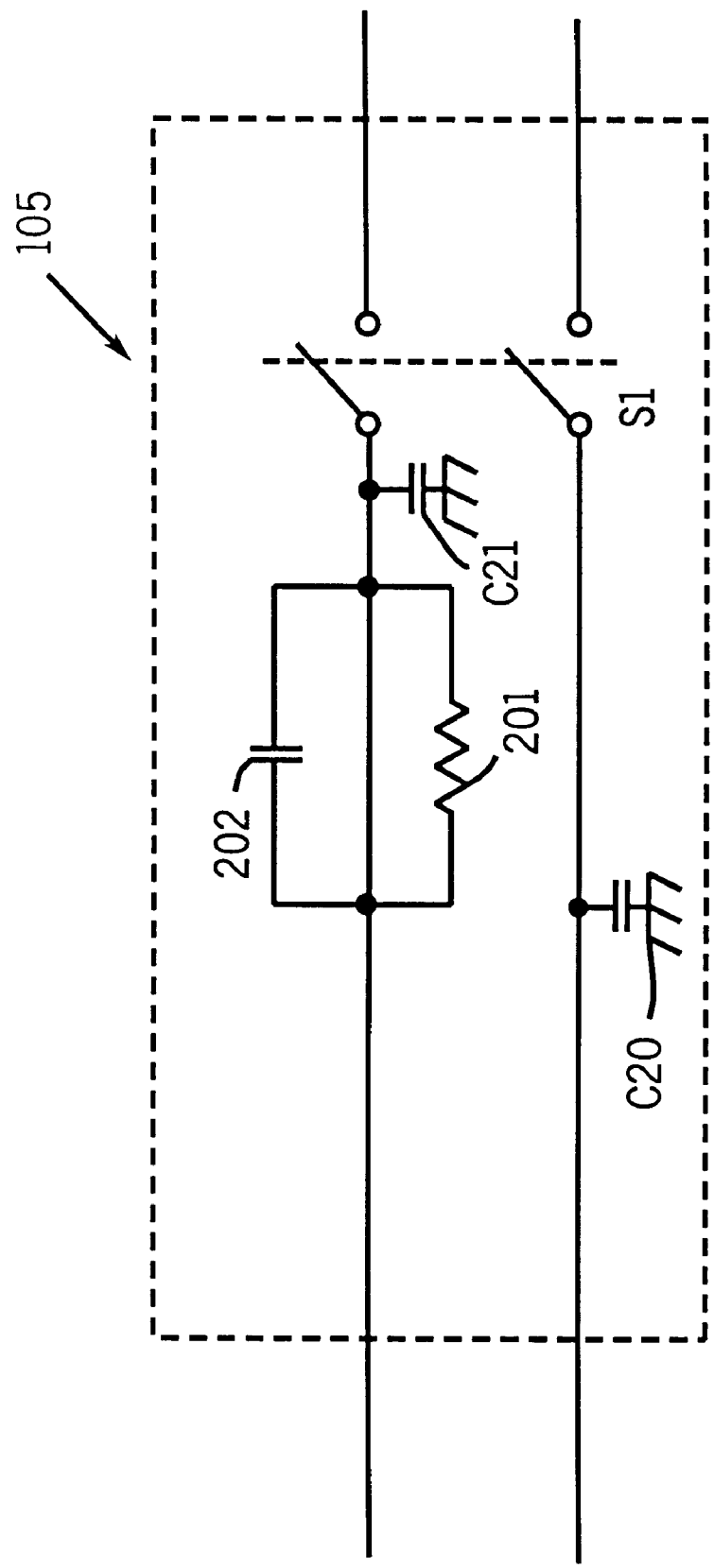
FIG. 2 is a circuit diagram of the protection circuit of FIG. 1.

Referring now to FIG. 2, a circuit diagram for protection circuit 105 is shown. As may be seen, protection circuit 105 may be easily designed and requires very few components. A positive temperature coefficient (PTC) resistor 201 replaces the inrush resistor of the prior art and is in series with a power switch S1. A relay 202 (normally open) is provided in parallel with thermistor 201 in the preferred embodiment. When the power supply is powered up (by turning power switch S1 on) the input voltage is applied to thermistor 201. Thermistor 201 is a 10 ohm resistor at normal operating temperature in the preferred embodiment. The inrush current is appropriately limited when the input voltage is appropriate for the linking. Relay 202 is closed after a few seconds if the linking is appropriate, in the preferred embodiment. The time delay for relay 202 is set by a capacitor and resistor in controller 108 (typically 1–3 seconds), just as it was in the prior art. After relay 202 is closed thermistor 201 is bypassed. A pair of input capacitors C20 and C21 filter the input.

However, if 230 vac are applied (by closing switch S1) when the power supply is linked for 115 vac, the inrush current causes thermistor 201 to heat up and its resistance temporarily increases. Then thermistor 201 effectively acts as an open circuit. Thus, the circuit components are protected. The closing of relay 202 is set by controller 108 so that if the input current is limited by thermistor 201 when the input voltage is misapplied, the relay will remain open. The temperature coefficient of thermistor 201 should be chosen so that, when 230 vac is misapplied, its resistance is sufficient to effectively isolate the power supply.

Figure 3:
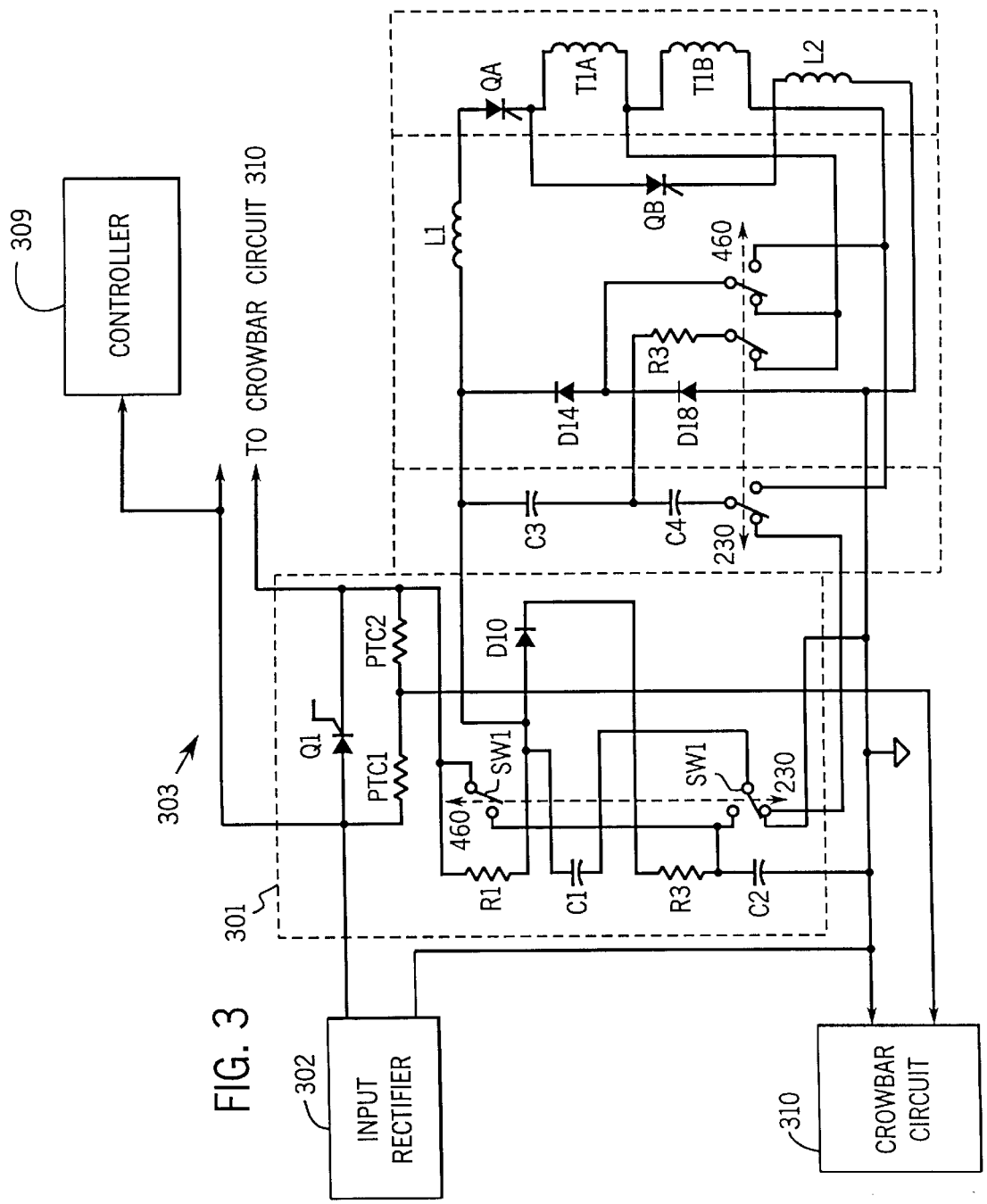
FIG. 3 is a circuit diagram of an alternative embodiment of the present invention.

FIG. 3 shows another embodiment of the present invention. The embodiment of FIG. 3 is used with an inverter circuit, although it could be used with other types of circuits. An inverter circuit 303 and includes a soft charge circuit 301. Soft charge circuit 301 includes a pair of dc bus hold up capacitors C1 and C2, which soft charge on power up via a pair of thermistors PTC1 and PTC2. The voltage across resistors PCT1 and PCT2 is monitored by a controller 309, which turns on a bypass SCR Q1 only after a successful soft charge cycle, signaled by the voltage across resistors PTC1 and PTC2 dropping below a threshold. Additionally, the voltage across resistors PCT1 and PCT2 is monitored by a crowbar circuit 310.

A pair of resistors R1 and R2 are provided to protect from surges. Specifically, surge resistors R1 and R2 provide a minimum resistance that limits the current when the inverter switches malfunction and/or cross conduct. The combination of resistors R1/R2 trip time limits for the input diodes in input rectifier 302 and bypass SCR Q1.

Inverter circuit 303 also includes a series resonant inverter comprised of a pair of capacitors C3 and C4 (which often are, in practice, banks of capacitors), an over voltage protection circuit including diodes D1A, resistor R3, and a pair of inductors L1, L2, a pair of switches QA and QB (SCR's in the preferred embodiment) and a pair of primary transformer windings T1A and T1B. Power is transferred to the secondary by means of alternately triggering SCR's QA and QB. As is well known in the art, the amount of power that is transferred is proportional to the frequency of SCR's QA and QB conduction. The switching of SCR's QA and QB is controlled by controller 309.

Crowbar circuit 310 monitors the voltage across input capacitors C1 and C2. When that voltage exceeds a predetermined level, crowbar circuit 310 crowbars the common junction of resistors PTC1 to PTC2, thus terminating the soft charge cycle and discharging capacitors C1 and C2. In a crowbar condition controller 309 prevents bypass SCR Q1 from turning on until the voltage across resistors PTC1 and PTC2 drops to a normal level at the end of a normal soft charge cycle. Additionally, crowbar circuit 310 prevents damage to other components, should the input line be improperly selected. Additionally, with excess current, resistors PCT 1 and PCT 2 (positive temperature coefficient resistors) will increase the resistance. Thus, the circuitry is protected in the event of an over voltage by thermistors PCT1 and PCT2.

Numerous modifications may be made to the present invention which still fall within the intended scope hereof. Thus, it should be apparent that there has been provided in accordance with the present invention a method and apparatus for protecting a power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A plasma cutting power supply that receives an input voltage and provides an arc output having an input protection circuit that comprises a thermistor in series with the input voltage, wherein the protection circuit is in electrical communication with the input voltage and wherein in the event an excess input voltage is applied the thermistor increases in resistance and electrically isolates the input voltage from a portion of the power supply downstream from the protection circuit, wherein the protection circuit includes a relay in parallel with the thermistor, wherein the relay is closed after a predetermined period of time after the application of power in the event the thermistor does not electrically isolate the input voltage.

2. The apparatus of claim 1 wherein the protection circuit is part of a precharge circuit.

3. A plasma power cutting supply that provides an arc output and includes an input protection means for disconnecting the input voltage from the power supply in the event that excess voltage is applied, wherein the protection means includes means for increasing in resistance in response to excess input voltage, wherein the thermistor means includes a relay in parallel with the thermistor, wherein the relay is closed after a predetermined period of time after the application of power in the event the thermistor does not disconnect the input voltage.

4. A arc welding power supply that receives an input voltage and provides an arc output having an input protection circuit comprising a thermistor in series with the input voltage, wherein the protection circuit is in electrical communication with the input voltage and wherein in the event an excess input voltage is applied the thermistor increases in resistance and electrically isolates the input voltage from a portion of the power supply downstream from the protection circuit, wherein the protection circuit includes a relay in parallel with the thermistor, wherein the relay is closed after a predetermined period of time after the application of power in the event the thermistor does not electrically isolate the input voltage.

5. The apparatus of claim 4 wherein the protection circuit is part of a precharge circuit.

6. A welding power supply that provides an arc output and includes an input protection means for disconnecting the input voltage from the power supply in the event that excess voltage is applied, wherein the protection means includes means for increasing in resistance in response to excess input voltage, wherein the thermistor means includes a relay in parallel with the thermistor, wherein the relay is closed after a predetermined period of time after the application of power in the event the thermistor does not disconnect the input voltage.

* * * * *